United States Patent [19]
Thornton et al.
[11] Patent Number: 4,976,022
[45] Date of Patent: Dec. 11, 1990

[54] SPRING PULLER

[76] Inventors: Theodore W. Thornton, 745 Pacific Ave., Salt Lake City, Utah 84104; Willem E. Leeflang, 3766 Haven Way, Salt Lake City, Utah 84109

[21] Appl. No.: 429,085
[22] Filed: Oct. 30, 1989
[51] Int. Cl.$^5$ ........ B23D 19/04
[52] U.S. Cl. ........ 29/227; 29/267
[58] Field of Search ........ 29/225, 227, 267, 270, 29/278; 254/131, 25, 17, 10.5

[56] References Cited

U.S. PATENT DOCUMENTS

| | | | |
|---|---|---|---|
| 1,938,102 | 12/1933 | Hill | 29/227 |
| 2,042,287 | 5/1936 | Allievi et al. | 29/227 |
| 2,465,030 | 3/1949 | Myers | 29/227 |
| 2,490,160 | 12/1949 | Riccio | 29/227 |
| 4,870,737 | 10/1989 | Navano | 29/267 |

*Primary Examiner*—Robert C. Watson
*Attorney, Agent, or Firm*—Mallinckrodt & Mallinckrodt

[57] ABSTRACT

A hand-held and hand-manipulated tool adapted to hook or unhook an extension type of helical spring, such as a trampoline spring, to or from an anchoring structure, such as the frame of a trampoline, is preferably formed as a unitary elongate lever of the second kind from steel bar stock advantageously having a rectangular cross section, the end of the lever being adapted to rest on the surface of the spring as a fulcrum, the opposite end portion providing the power arm of the lever and having a handle member formed at its free end transversely of the lever, and a work arm depending from between the power arm and the fulcrum adjacent to the fulcrum and formed to receive and hold the unanchored loop, hook, or eye end of the spring, whose other end is anchored to supporting structure, such as the grommeted margin of the trampoline jump sheet.

12 Claims, 1 Drawing Sheet

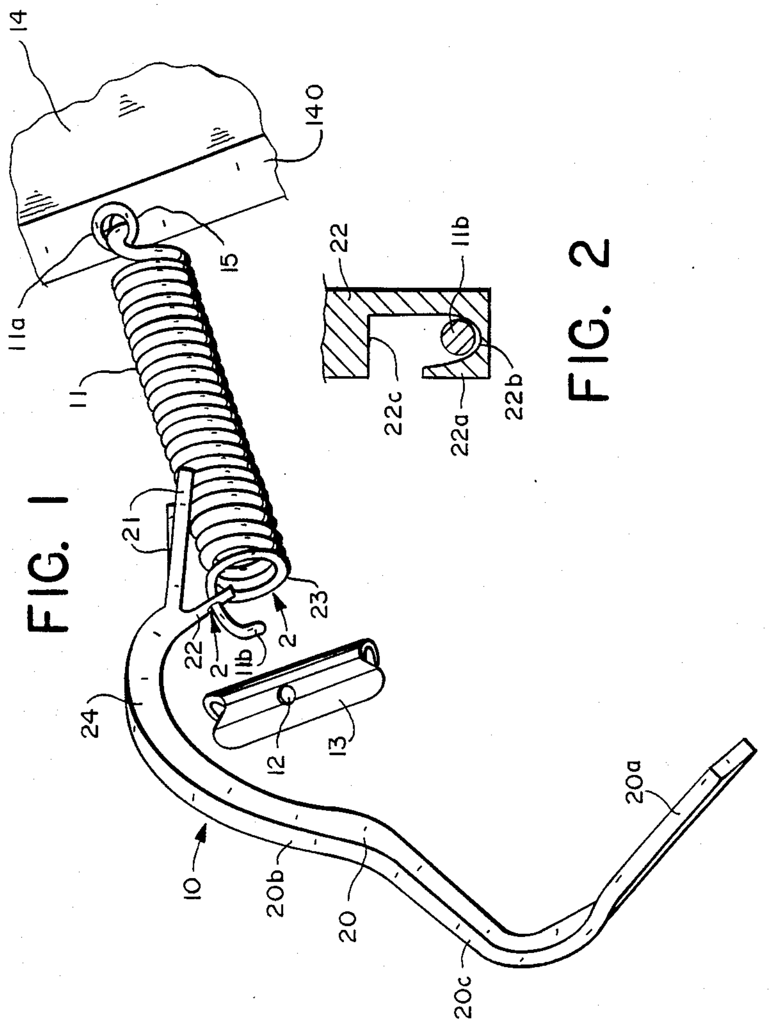
FIG. 1
FIG. 2
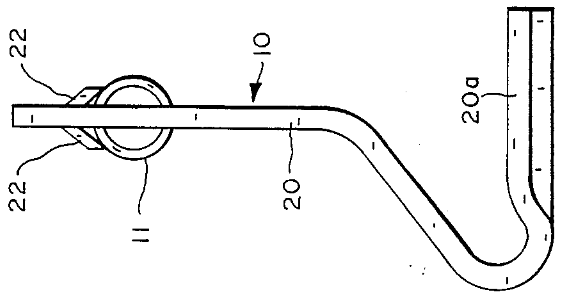
FIG. 3

SPRING PULLER

BACKGROUND OF THE INVENTION

1. Field: The invention is in the field of manipulators for helical springs, which are often referred to as coil springs.

2. State of the Art: Helical spring manipulators presently available are designed to either compress, stretch, or wind up a helical spring. As such, these devices are usually quite complex, and many rely on a jack or other screw device for imparting a mechanical advantage to the user. None of the available spring manipulators are especially adapted for quickly, easily, and successively stretching and manipulating closely coiled, strong, extension type helical springs relative to an anchoring device, such a trampoline. Manipulation, as well as stretching of the springs, is necessary when assembling or disassembling a trampoline, or when replacing a failed spring, since it is necessary to not only stretch the spring longitudinally but also to move the anchoring end of the spring transversely, more or less, in order to engage or disengage it, such as by hooking or unhooking it, relative to a frame or a jump sheet. Existing spring manipulators do not provide for this and are not readily applicable to trampolines. Moreover, they are not easily accommodated by the space available in trampolines. Consequently, trampoline springs are usually installed and removed by hand, entailing considerable difficulty and sometimes damage to the equipment or injury to the hands.

Accordingly, it was a principle objective in the making of the present invention to provide a simple, inexpensive hand-operated tool for use in attaching or detaching a loop at the end of a helical spring to an anchoring device, which tool permits motion of the manipulated end of the spring simultaneously in both a longitudinal and a transverse direction, can provide a mechanical advantage when required depending upon how it is used, without the use of a screw mechanism, and is adaptable to being used in a confined space.

SUMMARY OF THE INVENTION

In accomplishing the foregoing objective, a hand-held and hand-manipulated, rigid, unitary tool is formed as a lever, preferably from steel bar stock having a rectangular cross-section. As so formed, the tool comprises a power arm graspable by the user as a handle, a work arm having means to engage an anchoring loop, eye, or hook at the end of a helical spring, and a fulcrum member adapted to rest on the spring.

The device is a lever of the second kind, wherein the power arm is provided at one of its ends to serve as the handle, the fulcrum member is provided by the opposite end for resting on the spring, and the work arm projects angularly from between the power arm and the fulcrum member adjacent to the latter for engaging the loop, eye, or hook of the spring at the end of the spring to be manipulated. The power arm is preferably curved outwardly opposite to the angular extension of the work arm and has a transverse handle portion at its free end. When the tool engages the spring and is used as a lever, the force exerted by the user on the power arm results in an elastic distortion of the spring longitudinally, and usually also transversely, thereof to move the anchoring loop, eye, or hook to a position for easy hooking or unhooking relative to an anchoring structure, for example, the rigid supporting frame for the flexible jump sheet of a trampoline. In some instance, it will be only necessary to stretch the spring longitudinally or with only a slight transverse movement. In such instances, the fulcrum serves primarily as a stabilizing rest on the spring and the user's hand advantageously grasps the curved handle rearwardly on the curve.

THE DRAWINGS

An embodiment representing the best mode presently contemplated for carrying out the invention is shown in the accompanying drawing in which:

FIG. 1 is a perspective view of the tool at work installing a typical trampoline spring, one end of the spring being shown fully engaging a grommet in the fragmentarily shown jump sheet of the trampoline and the other end being hooked into the fragmentarily shown anchoring frame of the trampoline;

FIG. 2, a fragmentary, transverse, vertical section taken along the line 2—2 of FIG. 1 and drawn to a larger scale; and FIG. 3, a rear elevational view drawn to the scale of FIG. 1.

DETAILED DESCRIPTION OF THE ILLUSTRATED EMBODIMENT

The tool of the invention in its illustrated form, indicated 10, is shown in FIGS. 1 and 3 in the act of installing one end of a helical spring 11 in an anchoring hole 12 of the rigid framework 13 of a trampoline in which the jumpsheet 14 of the trampoline is resiliently supported. As is customary, a series of the springs 11 serves to resiliently attach the grommeted margin **14*a*** of the trampoline's jump sheet to the supporting framework.

As shown, there is a hook-providing, grommet-engaging loop **11*a* at one end of the spring and a similar anchoring loop 11*b* at the opposite end of the spring. Loop 11*a* has already been hooked in to the hole provided by a grommet 15 in the edge margin of jump sheet 14, and loop 11*b* is held by tool 10 ready to be hooked into hole 12 in supporting framework 13. When so attached, spring 11** will be partially expanded from its tightly wound and normally unstretched condition shown.

Tool 10 is preferably a unitary member, as shown, formed as a lever from steel bar stock of rectangular cross section. It comprises a power arm 20 having a transversely oriented handle portion **20*a*, at the free end of an outwardly curved portion 20*b*, for grasping by the user. At the opposite end of the tool is formed an advantageously forked fulcrum member 21. Between power arm 20 and fulcrum member 21, a work arm 22 projects angularly opposite to outwardly curved portion 20*b*. Work arm 22 is located adjacent to fulcrum member 21 but remote from handle portion 20*a* of the power arm and is formed as a re-entrantly hooked member 22*a*, FIG. 2, for engaging a portion of a the circumference of loop 11*b* of the spring in its overhung bed 22*b***.

Power arm 20, fulcrum member 21, and work arm 22 constitute a conventional lever of the second kind, wherein the resultant force exerted by work arm 22 is at a point between the actuating input force exerted at handle portion **20*a* of power arm 20 and fulcrum member 21. Thus, a mechanical advantage is imparted when the tool is used as a lever for effecting a slight transverse movement of loop 11*b* to open its loop formation as a hook and to lift the hook into position to be inserted in anchoring hole 12 of jump-sheet-supporting framework 13, as shown in FIG. 1**.

As shown, the curved portion **20*b* of power arm 20 is located between work arm 22 and a straight portion 20*c* of such power arm, so as to accommodate framework 13 of the trampoline. In this way, the tool can be manipulated sufficiently to facilitate insertion of hook 11*b* into hole 12. However, power arm 20 may be differently configurated depending upon the particular use. Thus, curved portion 20*b* may be merely a straight continuation of straight portion 20*c*** if no accommodation of an anchoring part is required.

As indicated in FIG. 3, the handle portion **20*a* of power arm 20 advantageously extends transversely of the longitudinal extent of the tool, so that a line joining the midpoints of the hand and wrist of the user lies approximately in a vertical plane passing through the axis of the spring to be manipulated, here spring 11**.

It should be noted that, in the embodiment shown, handle portion **20*a* of power arm 20 is offset transversely at either side of the longitudinal axis of spring 11. This facilitates manipulation of the tool, it can be seen that the loop 11*b* of spring 11 is engaged by the re-entrantly formed hook 22*a* of work arm 22, so as to be lifted when power arm 20 is moved upwardly around a center established by the free end of divergently forked fulcrum member 21 resting on spring 11, thereby distorting the spring both longitudinally and transversely. The re-entrantly formed hook 22*a* is constructed and arranged such that a portion of the loop 11*b* of the spring 11 is engaged in a recess 22*b*, closed on three sides by portions of work arm 22 and open only at the top, and such that portion 22*c* of work arm 22 forms an overhang, termed an overhung bed, above loop 11*b*. Thus in order to disengage loop 11*b* it is necessary to move hook 22*a* downwards, with respect to loop 11*b***, and then sideways.

In some instances, such distortion of the spring is undesireable and actually interferes with hooking its end into an anchoring hole or around an anchoring support. In such instances, it is desireable to merely stretch the spring longitudinally and to move the entire spring transversely without imparting any twisting motion. With the device as shown, this is accomplished by grasping the curved portion **20*b* of the power arm 20 approximately in line with the longitudinal axis of the spring so as to eliminate the force tending to twist the spring about the fulcrum point. In this way, tool 10 is merely pulled along the longitudinal axis of spring 11 to stretch the spring longitudinally. Then, loop 11*b* is moved transversely by moving the entire tool as well as the entire spring transversely, the opposite loop 11*a* of the spring pivoting about its anchorage in grommet 17. No twisting force is applied by work arm 22 about the pivoting points of fulcrum 21**.

As the tool is pulled to stretch the spring longitudinally, it is moved vertically (here upwardly) to position the free end 23, FIG. 1, of the open hook **11*b* above receiving hole 12 in trampoline frame member 13. The tool is then moved vertically downwardly to insert the hook end 23 and the entire hooked loop 11*b* of spring 11 into receiving hole 12. Following this the pulling force on tool 10 is released and the tool removed. For removing the spring from anchoring frame 13**, the reverse procedure is employed.

For use of the tool in this manner only, the tool itself could be constructed with a shortened power arm 20 so that the graspable portion of such arm would be vertically oriented in a plane aligned with the longitudinal axis of the spring. Thus, the device could be easily held by such graspable portion as a handle, without applying twisting pressure. Moreover, it should be realized that the handle portion of the power arm could be located, or that the power arm of the illustrated embodiment could be grasped, at any point between that aligned with the axis of the spring and a point substantially offset from alignment with such axis, so as to provide for any desired amount of twisting of the held end of the spring.

when the handle is vertically oriented in alignment with the longitudinal axis of the spring, or when the illustrated tool has its power arm grasped in alignment with the longitudinal axis of the spring, twisting movement about fulcrum member 21 is substantially eliminated. However, the received end of spring 11 is securely held and pulling force exerted on the spring is applied evenly over the entire coil length of the spring to stretch the spring substantially evenly over its length. This eliminates the problem that arises without the use of the tool of this invention, wherein the spring is grasped manually about its coils and is stretched until its hooked loop end can be inserted into an anchoring hole or about an anchoring support. In such instance, extension of the spring is provided only by those coils outside the grasp of the user, usually only about one-half or even less of the total number of coils, thereby causing excessive stretching of the grasped coils and possible deformation thereof relative to the remainder during installing of the spring. The tool of the invention allows spring extension to be spread substantially evenly over all of the coils of the spring and allows extension force to be easily applied from outside the supporting frame of the trampoline while keeping the held and normally closed loop end of the spring open and easily manipulatable for anchorage. Also, since the longitudinal stretching force is applied over the entire length of the spring, rather than merely over a portion of the spring, less force is required for stretching the spring the necessary amount.

Another feature of the invention, as is made clear by the drawings, is that no part of the device imposes any axial obstruction between the end 23 of the spring and the support 13 to which the spring is to be attached. This is important for devices such as trampoline as otherwise it would be necessary to leave an undesirable space between the end of the spring and the support.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A device for facilitating attachment to or detachment from an anchoring support of an extension type of helical spring provided with anchoring means such as loops, hooks, or eyes at its opposite ends, said device being a hand-held and hand-manipulated tool in the form of a lever of the second kind and comprising a power arm provided with a handle member at one end for grasping by the user of the tool; a work arm provided with means for engaging an anchoring loop, hook, or eye of the spring; and a fulcrum member at the opposite end for bearing against the spring during attachment or detachment thereof relative to the support, all being so constructed and arranged that no part of said device imposes an obstruction between said spring and said support along an axial extension of the axis of said spring.

2. A device according to claim 1, wherein the work arm projects angularly from between said power arm and said fulcrum member.

3. A device according to claim 2, wherein the work arm is adjacent to the fulcrum member and relatively remote from the handle member of the power arm.

4. A device according to claim 2, wherein the means for engaging the anchoring loop comprises a hook formation at the free end of the work arm so sized and shaped as to receive and hold a portion of the circumference of the anchoring loop of the spring.

5. A device according to claim 4, wherein the hook formation is reentrant relative to the work arm to provide an overhung bed for receiving the portion of the anchoring loop of the spring.

6. A device according to claim 2, wherein the lever is an elongate rigid bar having the handle member formed at one of its ends, and the fulcrum member at the other end.

7. A device according to claim 6, wherein the fulcrum member is forked with ends adapted to rest on the spring.

8. A device according to claim 2, wherein the power arm and its handle member are so constructed and arranged that a rectilinear line joining the midportions of a user's hand and wrist grasping the handle lies approximately within a vertical plane passing through the longitudinal axis of the spring.

9. A device according to claim 8, wherein the handle member is so placed as to extend transversely across a rectilinear extension of the axis of the spring.

10. A device according to claim 9, wherein the tool is fashioned from a unitary strip of steel bar stock having a rectangular cross section.

11. A device according to claim 1 wherein the fulcrum members is adapted to be slidably engaged with its support, thus leaving it free to move along the spring, and parallel to the axis of the spring, as the spring is stretched.

12. A device according to claim 2 wherein the fulcrum member is adapted to be slidably engaged with its support, thus leaving it free to move along the spring, and parallel to the axis of the spring, as the spring is stretched.

* * * * *